Dec. 12, 1967     S. H. TORREY     3,358,122
ELECTRICAL THERMOSTATIC CONTROL SYSTEM FOR ELECTRIC OVENS
Filed July 1, 1965
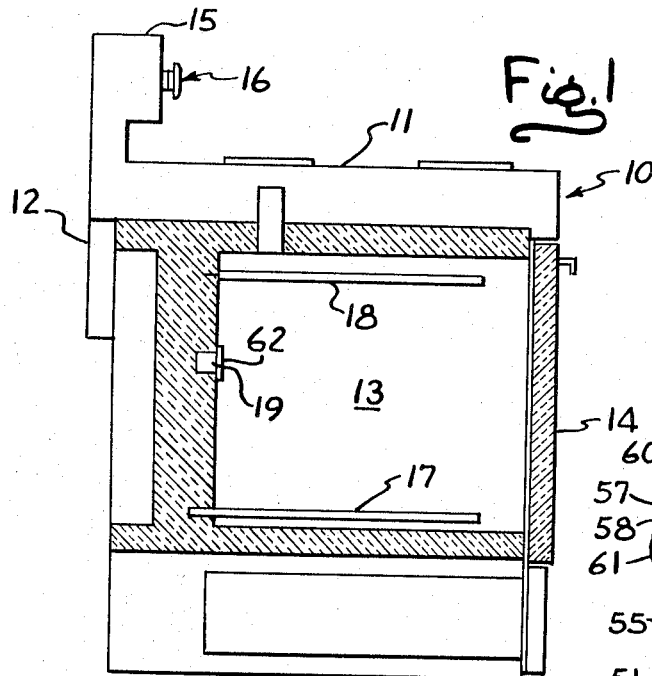
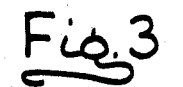
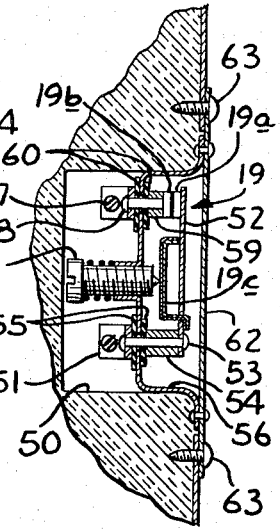
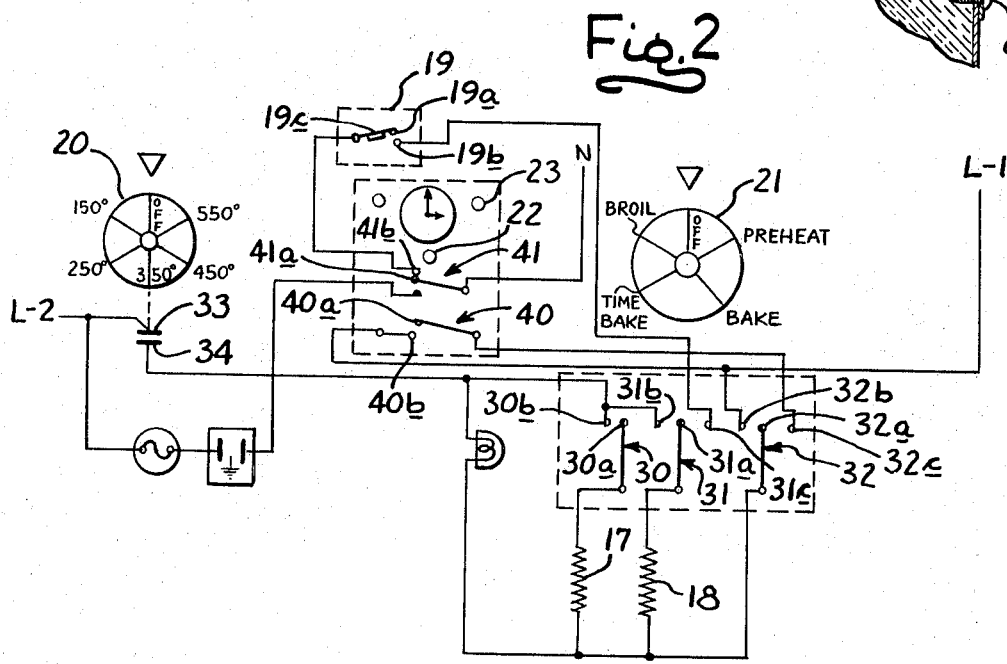
INVENTOR
SUMNER H. TORREY
by: Wolfe, Hubbard, Voit & Osann
ATTYS.

United States Patent Office 3,358,122
Patented Dec. 12, 1967

3,358,122
ELECTRICAL THERMOSTATIC CONTROL
SYSTEM FOR ELECTRIC OVENS
Sumner H. Torrey, Kankakee, Ill., assignor to Geo. D.
Roper Corporation, Kankakee, Ill., a corporation of
Massachusetts
Filed July 1, 1965, Ser. No. 468,825
7 Claims. (Cl. 219—413)

ABSTRACT OF THE DISCLOSURE

A thermostatic control system for an electric oven having an electric "bake" heating element and an electric "broil" heating element, a single pole variable thermostat which is selectively variable to control the energization of the heating elements according to the temperature of the oven, and a timer for controlling the energization of the heating elements according to preselected time settings. An auxiliary thermostatic control means illustrated as a preset bimetal thermostat, adapted to sense the oven temperature, is connected in circuit with the heating elements and a selector switch so that the setting of the switch to a preheat position connects the bake element in a high-wattage circuit and the broil element in a low-wattage circuit for rapid preheating to a preselected temperature, at which point the auxiliary control means de-energizes the broil element so that subsequent heating of the oven is effected by the bake element alone. The cooking period following the preheat is controlled by means of the timer. Following the cooking or baking period, an automatic holding or warming period may be initiated by means of the timer conditioning the low-wattage circuit for energization simultaneously with the de-energization of the high-wattage circuit. The auxiliary thermostatic control means energizes the conditioned low-wattage circuit in response to a predetermined oven temperature.

---

The present invention relates generally to electric ovens and, more particularly, to an improved electrical thermostatic control system for electric ovens.

It is a primary object of this invention to provide an electric oven including an improved electrical thermostatic control system for providing optional manual or automatic preheating prior to the normal cooking operation, and automatic warming or holding at the end of the normal cooking operation. A related object is to provide such a control system which provides greater heating uniformity and minimizes over-cooking of foods within the oven cavity even when held at the proper warming or holding temperature for extended times.

A more particular object of the present invention is to provide an electric oven including a control system of the foregoing type which utilizes a single thermostatic control element for controlling both the automatic preheating and the automatic warming or holding operations. In this connection, it is still another object of the invention to provide such a control system which permits the use of a single pole thermostat to control both the automatic preheating and terminal warming operations.

It is a further object of this invention to provide an electric oven including an improved control system of the above type in which both the automatic preheating and the automatic warming or holding operations are controlled by the radiating surface temperature of the oven walls, rather than by the oven air temperatures.

A still further object of this invention is to provide an improved electrical thermostatic control system for electric ovens which provides a relatively low level of radiant heat from the heating units during the automatic warming or holding periods at the termination of the normal cooking operation. A related object of the invention is to provide such a control system which achieves a high degree of uniformity of top and bottom heat during the automatic warming period, thereby minimizing any tendency toward over-cooking during extended warming periods.

Another object of this invention is to provide an automatic electric oven control system of the type described above which is economical to manufacture and which has a relatively long operating life.

Other objects and advantages of the invention will become apparent from the following detailed description taken in connection with the accompanying drawings, in which:

FIGURE 1 is a side elevation view, partly in section, of a free standing electric range including an electric oven embodying the present invention;

FIG. 2 is a schematic circuit diagram of an improved electrical thermostatic control system for use in the oven of FIGURE 1; and FIG. 3 is a sectional elevation view of an improved thermostatic control means provided by this invention.

While the invention will be described in connection with certain preferred embodiments, it is to be understood that the invention is not intended to be limited to the disclosed embodiments, but, on the contrary, it is intended to cover the various modifications and equivalent arrangements included within the spirit and scope of the appended claims.

Turning now to the drawings and referring first to FIGURE 1, there is shown a free standing electric range 10 having a top cooking surface 11, a range body 12 for supporting the cooking surface 11 and encompassing an oven cavity 13 and a front opening access door 14. Projecting upwardly from the back edge of the cooking surface 11 is a back splasher 15 containing various controlling components associated with the selector dials 16 mounted on the face thereof. For the purpose of heating the oven cavity 13, a lower bake heating unit 17 is positioned adjacent the bottom wall of the oven cavity, while an upper broil heating unit 18 is mounted adjacent the upper wall of the cavity. Mounted in the back wall of the oven cavity 13 is a thermostatic control assembly 19 which will be described in more detail below.

The two heating units 17 and 18 may be of conventional design and are typically formed as metal sheathed resistance heating elements commonly used in electric ovens of this type. The control dials 16 mounted on the back splasher 15 are shown schematically in FIGURE 2 and include a temperature selection dial 20, a cooking mode selector dial 21, and timer controls including a start time knob 22 and a stop time knob 23. The temperature selector dial 20 carries the usual temperature indicia, while the cooking mode selector dial 21 carries indicia for five different settings, namely, "off," "preheat," "bake," "time bake," and "broil." In order to arrange the heating elements 17 and 18 for different cooking modes, the selector dial 21 is operatively connected to a battery of selector switches 30, 31, and 32 each of which is connected to one or more of the heating elements.

Power is supplied to the oven control system through a three-wire, single phase, 240-volt A-C source which is represented in FIGURE 2 by the three lead wires identified as lines L-1 and L-2 and neutral wire N. For the purpose of controlling the oven temperature during a selected normal cooking operation, the temperature selection dial 20 is operatively associated with a conventional thermostatic control element including a pair of thermostat contacts 33 and 34 connected in the line L-2. As is well known, the opening and closing of the thermostat contacts 33 and 34 is controlled by a conventional temperature sensing element which, in turn, is controlled by the particular setting on the dial 20.

When the selector dial 21 is turned to the "preheat" setting, the two heating units 17 and 18 are arranged to be energized on full power for fast oven preheating. This preheating continues until the dial 21 is turned to another setting, that is, the preheating is manually controlled with no automatic termination. In order to connect the two heating units for full power energization, the "preheat" setting on the dial 21 causes the switch 30 to close contacts 30a and 30b, switch 31 closes contacts 31a and 31b, and switch 32 closes contacts 32a and 32b, thereby connecting the two heating elements 17 and 18 in parallel across lines L–1 and L–2 at 240 volts. Thus, full power is supplied to both the bake heating element 17 and the broil heating element 18 as long as the dial 21 remains at the preheat setting.

In accordance with one important aspect of the present invention, the "bake" setting on the selector dial 21 provides an automatic preheating operation by connecting the bake heating element 17 in a high wattage circuit and the broil heating element 18 in a low wattage circuit whereby both heating elements are energized for rapid preheating, with the low wattage circuit including a fixed thermostatic control means for deenergizing the broil heating element in response to a predetermined oven temperature whereby subsequent heating of the oven is effected by the bake heating element alone. Thus, setting of the dial 21 at the "bake" position causes switch 30 to close contacts 30a and 30b and switch 32 to close contacts 32a and 32b so as to connect the bake heating element 17 in a high wattage circuit across lines L–1 and L–2 at 240 volts. In order to connect the broil heating element 18 in a low wattage circuit, the dial 21 causes switch 31 to close contacts 31a and 31c so as to connect the broil element across line L–1 and neutral wire N at 120 volts. Consequently, the oven is preheated at a relatively fast rate due to the energization of the bake element on full power and the broil element on one-fourth power.

In order to automatically terminate the preheating period by deenergizing the broil element 18, so that a normal baking operation may be carried out with only the bake heating element energized, the fixed thermostatic control assembly 19 is connected in the low wattage circuit between the broil element and the neutral wire N. The thermostatic control assembly 19 includes a pair of contacts 19a and 19b which are opened and closed by means of a bi-metal member 19c. The contacts 19a and 19b are normally closed when the oven is cool. Then when the oven temperature reaches a predetermined level, the bi-metal member 19c opens the contacts to thereby deenergize the broil element 18. The bi-metal member 19c is suitably designed and located within cavity 13 to open the contacts during cold start heatup at an oven air temperature of about 320°–340° F. Yet it cyclically maintains a much lower oven air temperature during automatic warming. After the contacts 19a and 19b have been opened, the bake heating element 17 continues to add heat to the oven cavity under full power until the main thermostat control contacts 33 and 24 open. The main control thermostat then continues to cycle the bake heating element at the desired temperature, so that all heat input during the baking operation following termination of the automatic preheating period is achieved from the lower or bake heating element only.

When it is desired to carry out a timed baking operation, the dial 21 is turned to the "time bake" setting. This immediately connects bake heating element 17 in a high wattage circuit by causing switch 30 to close contacts 30a and 30b and switch 32 to close contacts 32a and 32c, thereby connecting the bake element across lines L–1 and L–2 at 240 volts. Since the bake element is connected to the line L–1 through contact 32c rather than contact 32b, the bake element is connected in series with contacts 40a and 40b in the timer. Consequently, if the operator adjusts the start time knob 22 so as to open the contacts 40a and 40b, the bake heating element 17 is not energized until the desired time period, determined by the setting of the knob 22, has lapsed. After the contacts 40a and 40b are closed, the bake element 17 is energized at full power and the baking operation is carried out in the normal manner.

The length of the timed baking period is determined by the setting on the stop time knob 23 in the automatic timer. At the end of the preselected baking period, the timer switch 40 opens the contacts 40a and 40b so as to deenergize the high wattage circuit.

In accordance with another aspect of this invention, the "time bake" setting connects the two heating elements in series in a low wattage circuit including the automatic timer and the same fixed thermostatic control means used in the automatic preheating operation. Upon deenergization of the high wattage circuit, the timer conditions the low wattage circuit for energization of the two series connected heating elements. The low wattage circuit is then subsequently energized by the closing of the thermostatic contacts 19a and 19b when the oven temperature drops to a predetermined level, so that the series connected heating elements provide a heat input for a warming or holding function at the end of the timed baking operation. Thus, in the illustrative embodiment, the "time bake" setting of the dial 21 causes the switch 31 to close contacts 31a and 31c to connect the broil heating element 18 in series with the bake element 17 and the thermostatic control element 19 and timer contacts 41a and 41b, with the entire series arrangement being connected across line L–2 and neutral wire N at 120 volts. Then when the high wattage circuit used for the normal baking operation is deenergized by the opening of timer contacts 40a and 40b, timer switch 41 simultaneously closes contacts 41a and 41b so as to connect the series arrangement of the two heating elements through contacts 31a and 31c to the neutral wire N. The low wattage circuit thus provided is not immediately energized because the thermostatic contacts 19a and 19b are still open due to the relatively high temperature of the oven during the normal baking operation. Since there is no heat input to the oven cavity at this time, the oven cools by natural means such as conduction and convection losses until the temperature has dropped sufficiently to actuate the bi-metal member 19c to close the thermostat contacts 19a and 19b. This completes the circuit between line L–2 and neutral wire N so as to energize the two heating elements and provide a warming or holding heat input. Thereafter, the oven is maintained at a substantially constant temperature by cyclic opening and closing of the contacts 19a and 19b with corresponding cyclic energization and deenergization of the series connected heating elements.

It will be appreciated that since the two heating elements are connected in series across the low supply voltage of 120 volts, each heating element will operate at 1/16 of its full power. This low wattage operation is desirable because the reduced heat output provides low sheath temperatures, thereby reducing the radiant heat produced by the two heating units. Moreover, in cases where the broil heating element has a lower resistance than the bake heating element, such as for providing a higher wattage for the broiling operations, the series connection during the warming operation results in a greater heat output from the lower bake unit than from the upper broil unit. This is advantageous because the cooked product is usually shielded from the lower bake unit by means of the cooking vessel, so that greater bottom heat than top heat is required to maintain uniform cooked product temperatures. Consequently, a highly uniform temperature is provided throughout the oven cavity, thereby minimizing any tendency toward over-cooking during extended warming periods.

In accordance with one important aspect of the present invention, the fixed thermostatic control assembly 19 is mounted in a recess in a wall of the oven cavity, and a thermally-conductive cover plate is mounted over the recess to enclose the thermostatic control assembly within the recess so that the ambient air within the recess is heated at substantially the same rate as the cavity walls. Thus, as shown in FIGURE 3, the back wall of the oven cavity 13 forms a recess 50 for receiving the fixed thermostatic control assembly 19. The thermostatic control assembly includes a moving contact 19a which is electrically connected to a terminal post 51 by means of a flexible blade 52, a conducting rivet 53, a spacer sleeve 54, and a pair of mica insulating plates 55 to isolate the assembly from its metal base plate 56. The movable contact 19a cooperates with a fixed contact 19b which is electrically connected to a second terminal post 57 by means of a self-contained conducting rivet 58, a spacer sleeve 59, and a pair of mica insulating plates 60 to isolate the assembly from the supporting plate 56.

In order to open and close the contacts 19a, 19b according to the temperature of the ambient air within the recess 50, a temperature responsive bimetallic control member 19c is secured to the flexible blade 52. When the temperature within the recess 50 reaches a predetermined level, the bimetallic member 19c expands sufficiently to bend the blade 52 to disengage the movable contact 19a from the fixed contact 19b, thereby opening the electrical control circuit connected across the two terminals 51, 57. In order that the bimetallic member 19c may be initially calibrated to any preselected temperature, a spring biased calibrating screw 61 is threaded through the supporting plate 56 into engagement with the center portion of the bimetallic member 19c. Thus, before the thermostatic control assembly is mounted within the recess 50, the calibration screw 61 may be turned to calibrate the bimetallic member, and the screw 61 may then be permanently cemented in place.

For the purpose of enclosing the thermostatic control assembly within the recess 50, a thermally-conductive cover plate 62 is mounted over the recess opening and secured to the surrounding cavity wall by means of suitable screws 63 or other fasteners. This cover plate 62, which may be conveniently made of aluminum, serves to protect the thermostatic control assembly from oven vapors, and also causes the ambient air within the recess to be heated at substantially the same rate as the walls of the oven cavity. Thus, the cover plate 62 shields the thermostatic control assembly and the ambient air within the recess from radiant and convection heating directly from the oven heating elements, so that the ambient air within the recess is heated primarily by heat conducted through the aluminum cover plate 62.

When the oven cavity is preheated from a cold start, the radiant and conduction heating of the oven cavity walls normally lags the convection heating of the oven air. Consequently, the temperature sensed by the bimetallic control member 19c lags behind the actual oven air temperature. For example, if the bimetallic member 19c is calibrated to open the contacts 19a, 19b at a temperature of 155° F., an actual oven air temperature of about 320 to 340° F. could be achieved from a cold start before the contacts 19a, 19b are opened. In other words, this thermostatic control system achieves the desired preheat temperature by taking advantage of a control overshoot due to a thermal lag of the control system behind the actual oven air temperature to be controlled. During automatic warming, it is desired to maintain the actual oven temperature at the designed temperature of 155° F. for which the bimetallic member is calibrated, but by this time the temperature of the oven walls, and thus the temperature of the ambient air within the recess 50, have come into equilibrium with the oven air temperature so that the temperature sensed by the bimetallic member 19c is essentially the same as the actual oven air temperature. As a result, this arrangement permits the use of a single thermostatic control assembly to achieve a relatively high oven air temperature during preheating from a cold start, and a relatively low oven air temperature during automatic warming or holding at the termination of a normal cooking operation.

As can be seen from the foregoing detailed description, the improved oven control system provided by this invention utilizes a single thermostatic control assembly for controlling both the automatic preheating and the automatic warming or holding operations. Also, the overall electrical thermostatic control system provides optional manual or automatic preheating prior to the normal cooking operation, and automatic warming or holding at the end of the normal cooking operation. The system also provides greater heating uniformity and minimizes overcooking of foods within the oven cavity even when held at the proper warming or holding temperature for extended times. In the preferred embodiment of the invention, both the automatic preheating and the automatic warming or holding operations are controlled by the radiating surface temperature of the oven walls, rather than by the oven air temperatures. Moreover, the improved control system provides a relatively low level of radiant heat from the heating units during the automatic warming or holding periods at the termination of the normal cooking operation, and achieves a high degree of uniformity of top and bottom heat during the automatic warming period thereby minimizing any tendency toward overcooking during extended warming periods.

I claim as my invention:

1. In an electric oven including an oven cavity, electric heating elements including a bake element and a broil element in heat transmitting relation to the oven cavity and adapted for connection to a source of voltage, first thermostatic control means including a selector for controlling the energization of the heating elements according to the temperature of the oven cavity and a preselected temperature setting, and a timer for controlling the energization of the heating elements according to preselected time settings, the combination of selector means for arranging the heating elements in various circuits of different wattages, and second thermostatic control means operatively associated with the heating elements and the timer, said selector means having a first setting for connecting the bake element in a high wattage circuit and the broil element in a low wattage circuit whereby both of said elements are energized for rapid preheating of the oven cavity, said low wattage circuit including said second thermostatic control means for deenergizing said broil element in response to a predetermined oven temperature whereby subsequent heating of the oven cavity is effected by the bake element alone, said selector means having a second setting for connecting the bake element in a high wattage circuit including said timer for heating the oven for a preselected period and then deenergizing the high wattage circuit, said second setting also connecting the bake element and the broil element in series in a low wattage circuit including said timer and said second thermostatic control means, said timer serving to condition the low wattage circuit for energization simultaneously with the deenergization of the high wattage circuit, and said second thermostatic control means serving to energize the conditioned low wattage circuit in response to a predetermined oven temperature.

2. In an electric oven including an oven cavity, electric heating elements including a bake element and a broil element in heat transmitting relation to the oven cavity and adapted for connection to a source of voltage, first thermostatic control means including a selector for controlling the energization of the heating elements according to the temperature of the oven cavity and a preselected temperature setting, and a timer for controlling the energization of the heating elements according to preselected time settings, the combination of selector means for arranging the heating elements in various circuits of different wattages, and single pole thermostatic control means operatively associated with the heating elements and the timer, said selector means having a first setting for connecting the bake element in a high wattage circuit and the broil element in a low wattage circuit whereby both of said elements are energized for rapid preheating of the oven cavity, said low wattage circuit including single pole thermostatic control means for de-energizing said broil element in response to a predetermined over temperature whereby subsequent heating of the oven cavity is effected by the bake element alone, said selector means having a second setting for connecting the bake element in a high wattage circuit including said timer for heating the oven for a preselected period and then deenergizing the high wattage circuit, said second setting also connecting the bake element and the broil element in series in a low wattage circuit including said timer and said single pole thermostatic control means, said timer serving to condition the low wattage circuit for energization simultaneously with the deenergization of the high wattage circuit, and said single pole thermostatic control means serving to energize the conditioned low wattage circuit in response to a predetermined oven temperature, said selector means having a third setting for connecting the bake element and the broil element in parallel in a high wattage circuit.

3. In an electric oven including an oven cavity, electric heating elements including a bake element and a broil element in heat transmitting relation to the oven cavity and adapted for connection to a source of voltage, first thermostatic control means including a selector for controlling the energization of the heating elements according to the temperature of the oven cavity and a preselected temperature setting, and a timer for controlling the energization of the heating elements according to preselected time settings, the combination of selector means for arranging the heating elements in various circuits of different wattages, and single pole thermostatic control means operatively associated with the heating elements and the timer, said selector means having a first setting for connecting the bake element in a high wattage circuit and the broil element in a low wattage circuit whereby both of said elements are energized for rapid preheating of the oven cavity, said low wattage circuit including single pole thermostatic control means for deenergizing said broil element in response to a predetermined oven temperature whereby subsequent heating of the oven cavity is effected by the bake element alone, said selector means having a second setting for connecting the bake element in a high wattage circuit including said timer for heating the oven for a preselected period and then deenergizing the high wattage circuit, said second setting also connecting the bake element and the broil element in series in a low wattage circuit including said timer and said single pole thermostatic control means, said timer serving to condition the low wattage circuit for energization simultaneously with the deenergization of the high wattage circuit, and said single pole thermostatic control means serving to energize the conditioned low wattage circuit in response to a predetermined oven temperature, said selector means having a fourth setting for connecting the broil element in a high wattage circuit and opening the circuit to the bake element.

4. An electric oven as defined in claim 1 in which said second thermostatic control means comprises a pair of contacts and a temperature responsive bi-metallic control member operatively associated with said contacts for opening and closing the contacts according to the temperature of said control member, said contacts and said control member being mounted in a recess in the wall of the oven cavity, and a thermally conductive cover plate mounted over said recess to shield said contacts and said control member from radiant and convection heating directly from the heating elements in the oven cavity, said cover plate engaging the cavity wall around said recess so that the air within said recess is heated by conduction from the cavity wall through said cover plate.

5. An electrical thermostatic control system for an electric oven having an oven cavity, electric heating elements including a bake element and a broil element in heat transmitting relation to the oven cavity and adapted for connection to a three-line single phase voltage source providing both a high voltage and a low voltage input supply, selectively variable single pole thermostat means for sensing the oven temperature and controlling the energization of the heating elements to provide a preselected temperature in the oven cavity, and a timer including a selector for controlling the energization of the heating elements according to preselected time settings, said control system comprising the combination of a preset auxiliary thermostatic control means operatively associated with said heating elements and said timer for sensing the oven temperature, a selector switch having a plurality of different settings for connecting said heating elements across different voltage inputs and in different circuits with each other and with said timer and said auxiliary thermostatic control means, said selector switch being responsive to a first setting for connecting the bake element to the high voltage supply and connecting the broil element to the low voltage supply for rapid preheating of the oven cavity independently of said timer, said broil element being connected in series with said auxiliary thermostatic control means for de-energizing the broil element and maintaining the energization of said bake element in response to a predetermined oven temperature so as to automatically terminate the preheating period and initiate a baking period.

6. An electrical thermostatic control system as defined in claim 5 in which said selector switch is responsive to a second setting for connecting said bake element and said broil element in parallel across the high voltage supply.

7. An electrical thermostatic control system as defined in claim 5 in which one of the walls of the oven cavity forms a recess for receiving said auxiliary thermostatic control means, and said auxiliary thermostatic control means comprises a pair of contacts and a temperature responsive bi-metallic control member operatively associated with said contacts for opening and closing the contacts according to the temperature of said control member, said contacts and said control member being mounted in said recess in the wall of the oven cavity, and a thermally conductive cover plate mounted over said recess to shield said contacts and said control member from radiant and convection heating directly from said heating elements, said cover plate engaging the cavity wall around said recess so that the air within said recess is heated by conduction from the cavity wall through said cover plate.

References Cited

UNITED STATES PATENTS

| 987,161 | 3/1911 | Ogden | 219—413 |
|---|---|---|---|
| 2,221,870 | 11/1940 | Kahn et al. | 219—414 X |
| 2,790,056 | 4/1957 | Fry | 219—398 |
| 3,032,636 | 5/1962 | Schaver | 219—413 X |
| 3,073,938 | 1/1963 | Turner et al. | 219—412 X |
| 3,170,061 | 2/1965 | Colalillo | 219—413 |

RICHARD M. WOOD, *Primary Examiner.*

C. ALBRITTON, *Assistant Examiner.*